C. J. POWELL.
CONTROLLING MECHANISM.
APPLICATION FILED JUNE 29, 1914.

1,164,749.

Patented Dec. 21, 1915.
5 SHEETS—SHEET 2.

WITNESSES:
H. M. Gillespie
J. B. Lagorio Jr.

INVENTOR.
Charles J. Powell
BY Barlett & Truman
ATTORNEYS.

C. J. POWELL.
CONTROLLING MECHANISM.
APPLICATION FILED JUNE 29, 1914.

1,164,749.

Patented Dec. 21, 1915.
5 SHEETS—SHEET 3.

C. J. POWELL.
CONTROLLING MECHANISM.
APPLICATION FILED JUNE 29, 1914.

1,164,749.

Patented Dec. 21, 1915.
5 SHEETS—SHEET 4.

WITNESSES:
H. M. Gillespie
J. B. Sagorio

INVENTOR.
Charles J. Powell
BY Barnett & Numan
ATTORNEYS.

C. J. POWELL.
CONTROLLING MECHANISM.
APPLICATION FILED JUNE 29, 1914.

1,164,749.

Patented Dec. 21, 1915.
5 SHEETS—SHEET 5.

WITNESSES:
INVENTOR.

UNITED STATES PATENT OFFICE.

CHARLES J. POWELL, OF CHICAGO, ILLINOIS, ASSIGNOR, BY DIRECT AND MESNE ASSIGNMENTS, OF EIGHT TWENTY-FIFTHS TO EDWARD F. FALKENBERG AND FIVE TWENTY-FIFTHS TO S. E. BROWN, BOTH OF CHICAGO, ILLINOIS.

CONTROLLING MECHANISM.

1,164,749.   Specification of Letters Patent.   Patented Dec. 21, 1915.

Application filed June 29, 1914. Serial No. 847,982.

*To all whom it may concern:*

Be it known that I, CHARLES J. POWELL, a citizen of the United States, residing at Chicago, in the county of Cook and State of Illinois, have invented certain new and useful Improvements in Controlling Mechanism, of which the following is a specification.

My invention relates to a controlling mechanism which operates, when actuated, to effect certain movements at timed intervals, a mechanism of this general character being disclosed in my co-pending application Serial No. 805,107, filed December 6, 1913, and entitled Controlling apparatus for a light or lighting system; the apparatus disclosed in that application being intended particularly for controlling a lighting circuit in a hallway or other apartment through the opening and closing of the door or doors leading into and from said hallway, although, as stated in the specification of the application, the apparatus is capable of being employed in other connections and for other purposes.

The present invention provides certain improvements upon the apparatus disclosed in my aforesaid application with the object particularly of making the apparatus more accurate, certain and reliable in its operation.

A further specific object of the present invention is to provide means for positively holding together the contact elements in the lighting circuit as soon as said contacts have been brought together by operation of the controlling apparatus and releasing the same in such manner that they will separate quickly, when caused so to do by the operation of said apparatus, whereby the destruction of the contacts through arcing is prevented.

A further specific object of the invention is to effect certain improvements in the construction and arrangement of the buckets for the counterbalancing fluid employed for operating the controlling mechanism whereby the timing function of the apparatus is accomplished with a greater degree of accuracy than was possible with the arrangements shown in the application aforementioned.

The invention has for further objects such other new and improved constructions, arrangements and devices relating to timing or controlling mechanisms as will be hereinafter described and claimed.

The invention is illustrated, in a preferred embodiment, in the accompanying drawings wherein—

Like characters of reference designate like parts in the several figures of the drawings.

Figure 1:
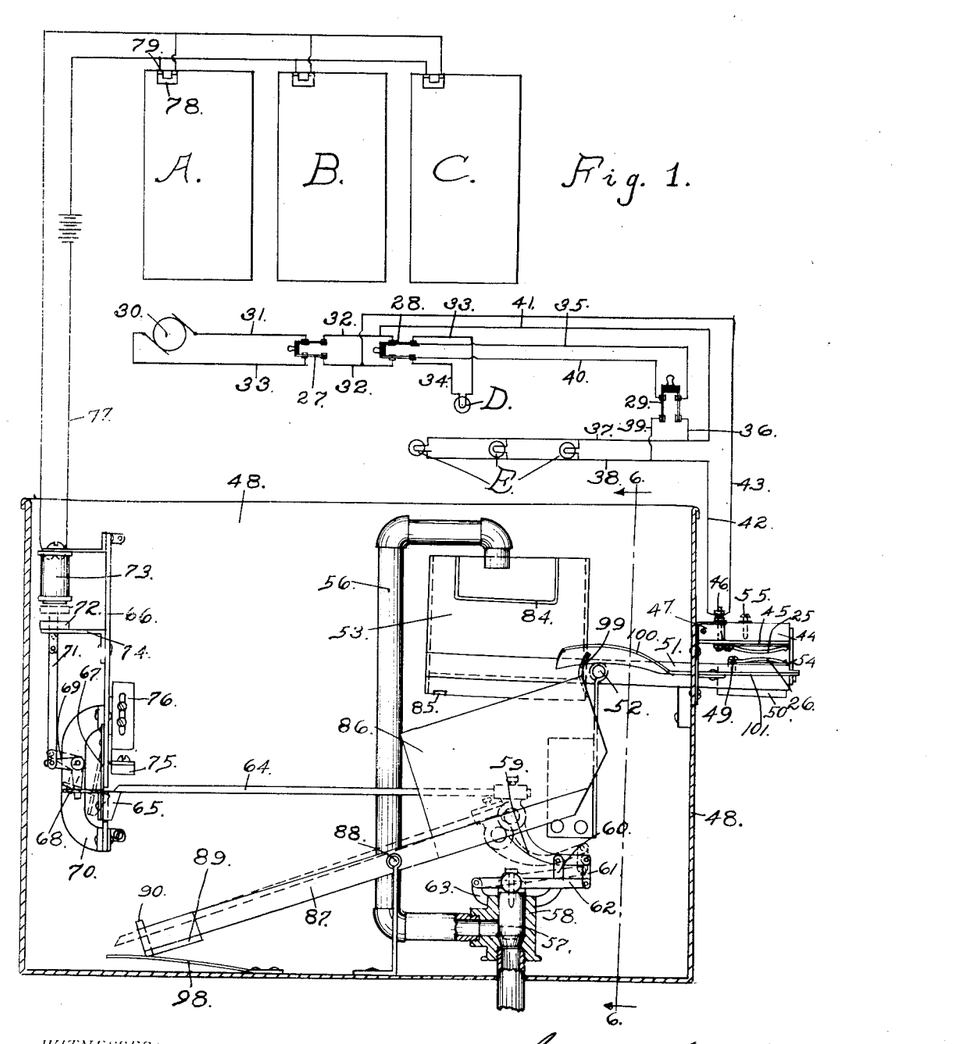
Figure 1 is a sectional elevation of the improved controlling device of the present invention shown as utilized for the control of the lighting system for the hallway of an apartment building, the lamps, switches and the doors, by the opening and closing of which certain of the switches are operated, being represented diagrammatically.

Referring first to the diagram forming part of Fig. 1, A, B and C designate three doors leading into an apartment, for example, the hallway of a building, in which are lights, for example, electric lamps, D and E, E, E, subject to control by the apparatus shown in the lower part of the figure. The lamp D is assumed to be in the lower hallway or vestibule, the lights E on the upper stairs or adjoining hallways. The lamps D and E are lighted whenever any of the doors A, B and C are opened. The function of the apparatus shown in the lower part of the figure, and in the other views of the drawings, is to keep the hallway illuminated for a sufficient period of time after the person has entered through one of the doors, to give such person time to leave the hallway and at the expiration of such period (which is automatically prolonged under certain circumstances as will be hereinafter described) to extinguish the lamps. In the preferred arrangement shown, the lamp D, located in the lower hall, may be either subject to control by the apparatus or may be constantly illuminated without disturbing the control by the apparatus of the lamps E. Or, if desired, all of the lamps D and E may be disconnected from the controlling mechanism and kept constantly lighted. The circuit through the lamps, when controlled by the apparatus, is closed through two pairs of spring contacts 25, 25 and 26, 26, which are brought together and separated as will be hereinafter described. 27, 28, 29 are knife blade switches, the positions of which determine the control by the controlling mechanism of the lamps. With all three switches closed lamps D and E are constantly supplied with current, the controlling mechanism being cut out. The circuit through lamp D is as follows: From the generator 30 through wire 31, swtich 27, wire 32, switch 28, wire 33, lamp D, wire 34, switch 28, wire 32, switch 27 and wire 33. The circuit through the lamps E is as follows: Wire 35, switch 29, wires 36, 37, 38 and 39, switch 29 and wire 40.

In order that lamp D should be constantly lighted and the lamps E controlled by the controlling mechanism, switch 29 is opened, switch 28 remaining closed. Lamp D receives current as before. The lamps E are supplied through the following circuit: Wires 41, 37, 38, 42, contacts 25 and 26, and wire 43.

In order that both lamp D and lamps E should both be controlled by the machine switch 28 is opened and switch 29 closed. The lamps E are supplied through the circuit last described. The lamp D is supplied through the following circuit: Wire 36, switch 29, wire 35, wire 33, lamp D, wires 34 and 40, switch 29 and wire 39.

By opening switch 27 the entire system is cut out. The controlling mechanism for making and breaking the circuit at 25, 26, whereby the lamps under control are lighted and extinguished, will now be described. The contact springs 25 are secured to the under side of a fiber block 44 against wear strips 45 by means of binding posts 46 to which run the wires 42, 43. The fiber block is secured by means of a bracket 47 to the main casing 48 of the apparatus. The contact springs 26 are secured by screws 49 to a fiber block 50 supported at the end of a frame 51 pivoted to the casing 48 at 52 and carrying at its opposite end a bucket 53. The contact springs 26 bear upon a connecting and wear plate 54 on the upper side of the block 50. One pair of contact springs, for example, the upper springs 25, may be adjusted as to their tension by set screws 55 extending through the block 44.

Figure 9:
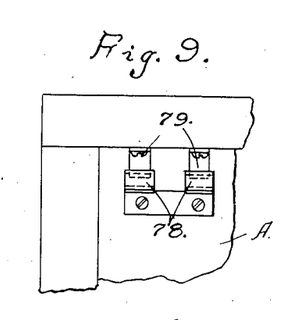
Fig. 9, a front view of one of the door operated switches.
Figure 10:
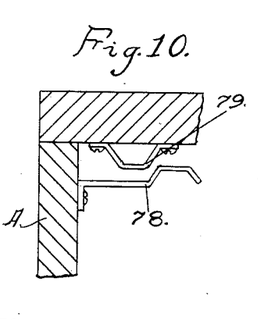
Fig. 10, a side view of the same showing the door and door frame in section.
Figure 11:
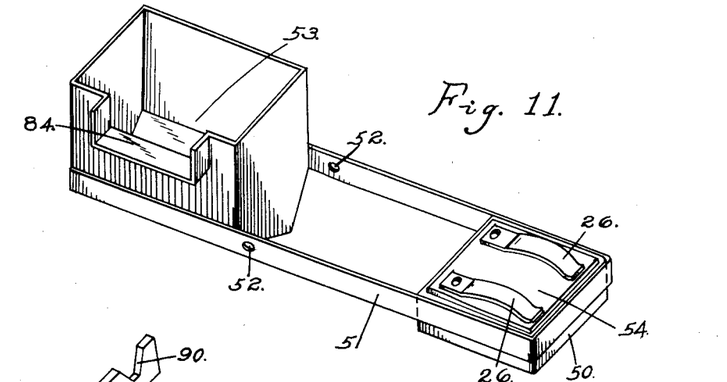
Figs. 11 and 12, views, in perspective, of the upper and lower buckets, respectively, and their supporting arms.

The bucket 53 is filled with a counterbalancing fluid, water for example, from a pipe 56 provided with a valve 57 contained in a valve casing 58. The valve is operated by a lever 59 mounted on a bracket 60 formed on the valve casing 58, connected by a link 61 with a lever 62, pivoted to a bracket 63 on the valve casing 58 to which last mentioned lever the valve is attached. The lever 59 is provided with a long arm 64 adapted to rest on a spring latch 65 secured to a bracket 66 on the side of the casing 48. Secured to the spring shank 67 of the latch 65 is an angular member 68 formed with a slot into which projects one arm of the bell crank 69 pivoted to a support 70 on the bracket 66. The other end of the bell crank is connected by a link 71 with the armature 72 of an electro-magnet 73, the armature resting, when not attracted to the magnet, on a shelf 74. The upward movement of the rod 64 is limited by a buffer block 75 on a bracket 76 (Fig. 8) secured to the side of the casing 48. The circuit 77 of magnet 73 is closed when any one of the doors A, B and C is opened so as to bring the spring contacts 78 on the door against the contacts 79 on the door frame (Figs. 1, 9 and 10).

Figure 14:
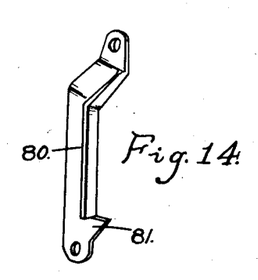
Fig. 14, a view, in perspective, of said latch, and Fig. 15, a similar view of the catch engaged by said latch.
Figure 15:
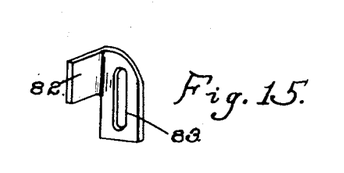

If the rod 64 is free to move downwardly when the latch 65 is withdrawn, it will fall of its own weight and by rocking levers 59 and 62 raise the valve so as to fill the bucket 53 with water. As soon as the water enters bucket 53 the pivoted contact arm 51 is rocked so as to bring the contact springs 26 against the contact springs 25 and close the lamp circuit. As soon as the contact springs 25, 26 are brought together by the rocking of arm 51 an engagement is effected between the blocks 44, 50 which keeps the springs in intimate contact preventing the arcing which would take place if the movement of the bucket were sudden and sharp enough to cause the lower springs to rebound from the upper ones. This engagement is effected by a latch 80 (Fig. 14) pivoted to the upper block 44 and formed with a tooth 81 which engages a catch lug 82 on a plate 83 adjustably secured to the lower block 50.

Figures 6, 7, 8:
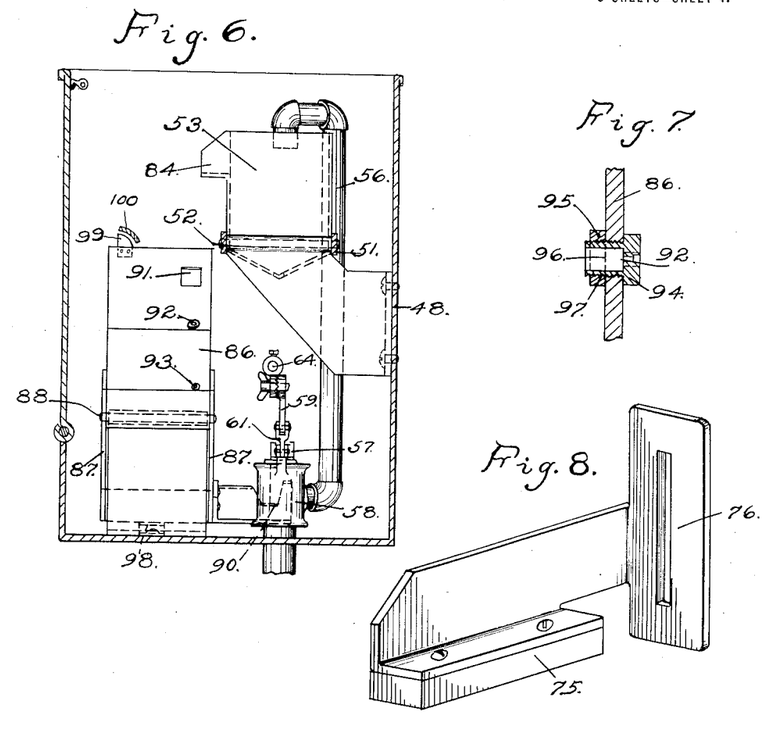
Fig. 6, a sectional view taken on line 6—6 of Fig. 1.
Fig. 7, a sectional detail showing one of the bleeding port plugs of the lower bucket.
Fig. 8, a view, in perspective, of the buffer for the valve operating arm and the supporting bracket therefor.
Figure 12:
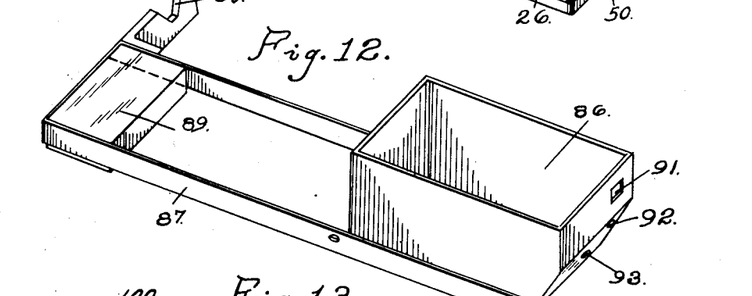
Figure 13:
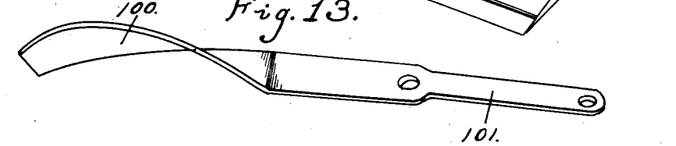
Fig. 13, a similar view of the lever for withdrawing the latch which holds the circuit making and breaking elements together.

The bucket 53 is formed with a wide rectangular mouth 84 and in the bottom with a bleeding port 85. Arranged below and at one side of the bucket 53 and in position to receive the overflow from the mouth 84 of said bucket, is a bucket 86 carried on one end of a frame 87 pivoted at 88 to the casing 48 of the apparatus and provided at the opposite end with a counterweight 89 and with a notched arm 90 adapted to engage the valve operating arm 64 (Fig. 12). The bucket 86 is provided preferably with an equalizing port 91 and two bleeding ports 92, 93, one above the other, the upper port having preferably the larger diameter. These ports are preferably formed as shown in Fig. 7. Referring to this figure, 94 designates a plug having a threaded stem 95 extending through the wall of the bucket and formed with a relatively large bore 96. The head of the plug is formed with a smaller bore constituting the bleeding port 92 or 93, as the case may be. This port is accurately drilled so that the outflow therethrough may be accurately calculated. In order to vary the rate at which the water will flow out through the bleeding ports 92, 93, it is only necessary to remove the plugs in which the ports are formed and substitute plugs having bores of larger or smaller diameters as may be required. The plugs are held in place by nuts 97.

The pivoted frame 87 is intended to assume three positions. When the bucket is empty the counterweighted end rests upon a leaf spring 98 on the bottom of the casing 48. When the bucket is filled the counterweighted end is raised so that the notched arm 90 engages the valve operating arm 64 and holds the same against the buffer 75. When the water in the bucket has outflowed sufficiently to reach the level of the bleeding port 92 the counterweighted end of the arm 87, aided by the weight of the valve operating rod 64, overcomes the weight of the water in the bucket sufficiently to allow the valve operating rod 64 to tilt down against the latch 65. The counterweighted end of frame 87 does not, however, tilt down against spring 98 until the remaining body of water in the bucket has leaked out through the bleeding port 93.

The bucket 86, by the tilting movement which results from the emptying of the bucket, withdraws the latch 80 from its engagement with the catch 82 so as to release the tilting frame 51 on which the contact springs 26 are placed. By this time the bucket 53 is emptied so that the contacts 26 separate from contacts 25 by a quick sharp movement, aided, of course, by the elasticity of the contacts. To accomplish this operation the bucket 86 is formed with a finger 99 which bears against a cam 100 on the end of a lever 101 pivoted to a bracket plate 102 on the outside of casing 48, the lever extending through an aperture 103 in the casing. The lever is connected by a link 104 with the latch 80. The finger 99 does not come into contact with the cam 100 until the counterweighted end of the frame 87 has compressed the leaf spring 98. The compression of the spring occurs because of the momentum of the frame. In the normal position which the frame assumes against the spring 98 after its falling momentum has been spent, the finger stands a trifle out of contact with the cam 100. A leaf spring 105 bears against lever 101 and tends to keep the latch 80 against the catch 82 with the tooth 81 of the latch either under the catch or against the side face of the same according to the angular position of the upper bucket frame.

Figure 2:
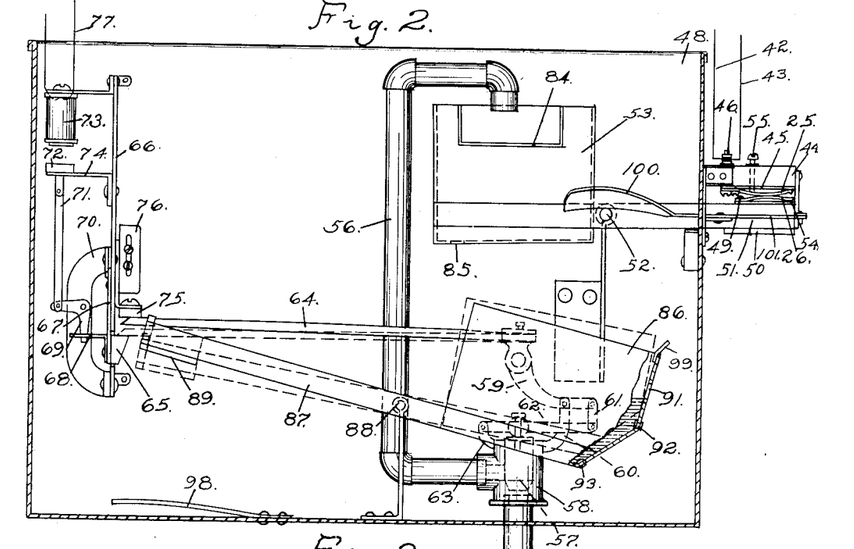
Fig. 2 is a view of the controlling mechanism similar to the representation thereof contained in Fig. 1 but with the operative parts of the mechanism in a different relative position.
Figure 3:
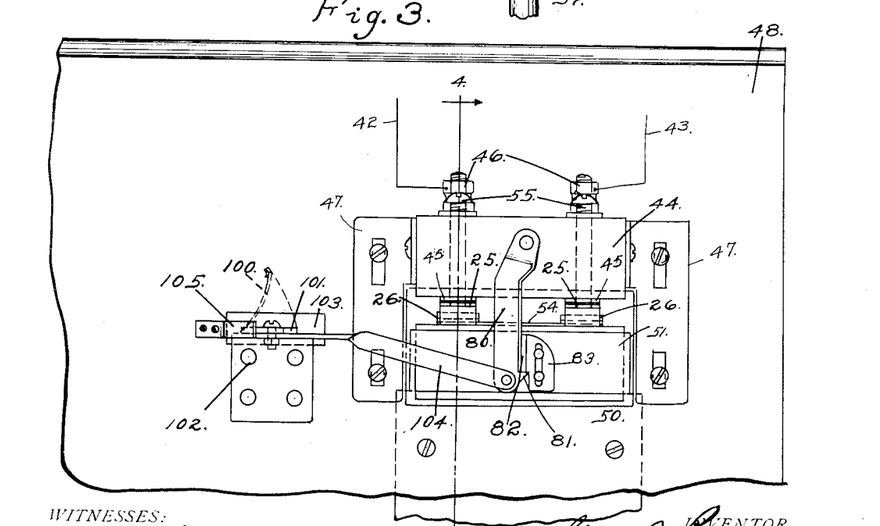
Fig. 3 is a fragmentary end elevation of the apparatus showing the parts in the relative positions shown in Fig. 2.
Figure 4:
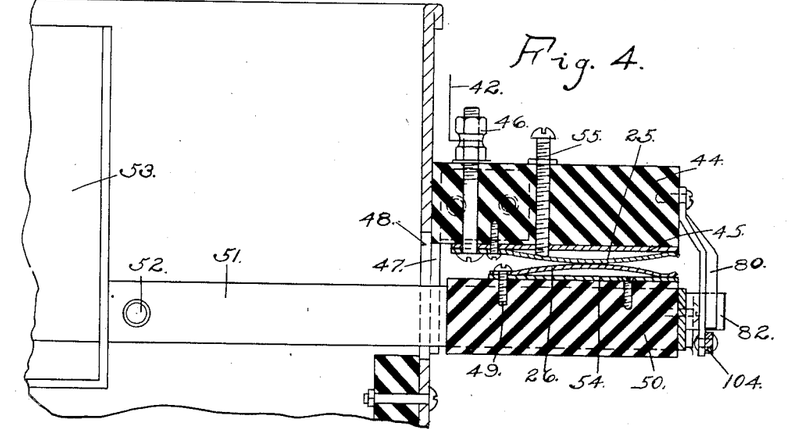
Fig. 4 is a sectional view taken on line 4—4 of Fig. 3.
Figure 5:
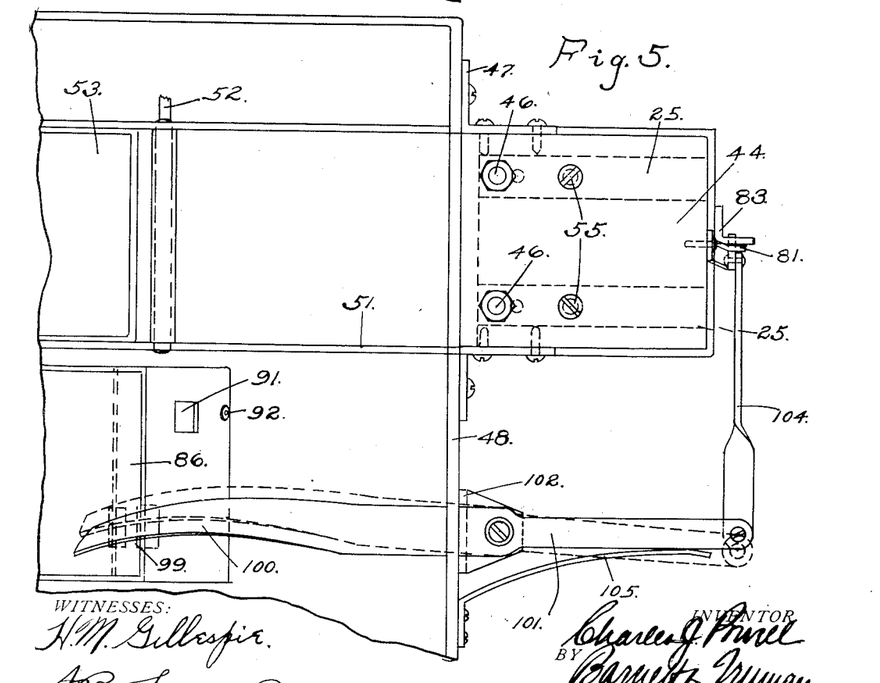
Fig. 5, a fragmentary plan view of the end of the apparatus shown in Figs. 3 and 4.

The controlling mechanism above described might obviously be used in a variety of different situations for effecting a time control of another apparatus or movable part. The operation of the mechanism will be described as utilized for the control of an electric light system, and is as follows, it being assumed, for the purpose of simplifying the explanation, that the position of the switches 28, 29 is such as to put the lamp D as well as the lamps E under the control of the apparatus: When a person enters the hallway through one of the doors A, B or C, the circuit of magnet 73 is closed at 78, 79, and the magnet is energized, attracting its armature 72 which withdraws the latch 65. Before the latch 65 was withdrawn the valve operating rod 64 rested thereon so that the valve 57 in pipe 56 was closed. The bucket 86 being empty, its counterweighted end 89 rested upon the spring 98 in the bottom of the casing. The full lines in Fig. 1 show the parts in these positions. Upon the withdrawal of the latch 65 the rod 64 falls to the dotted line position of Fig. 1, opening valve 57. Water from pipe 56 flows into the upper bucket 53 immediately tilting the same downwardly so as to bring the contact springs 26 against contact springs 25 and close the light circuit. The latch 80 snaps in place under the catch 82 being impelled thereto by its weight and the force of spring 105 and holds the contacts firmly one against the other, thus preventing any tendency to re-bound which would cause arcing. The water very quickly reaches the level of the mouth 84 of the bucket 53 and overflows into the bucket 86. This causes the bucket 86 to tilt from the position shown in Fig. 1 to the position shown in Fig. 2, the framing of the bucket carrying with it the valve operating rod 64 and closing valve 57 so as to shut off the water supply. As soon as the bucket assumes this position, if the water therein stands above the port 91, the excess is instantaneously discharged through this port which is comparatively large. The intended operation of the device contemplates introducing into the lower bucket an amount of water a trifle in excess of that required for the timing operation so that by the equalizing of the charge through the outflow from port 91 the timing operation will be perfectly accurate, depending upon the diameters of the bleeding ports 92, 93. These ports are formed in removable plugs 94 (Fig. 7) which can be readily changed so as to vary the timing intervals of the mechanism. Assuming, to take a concrete case, that each person entering the hallway is to be given two minutes of illumination, the size of bleeding ports 92, 93 are proportioned so that the water in the bucket will reach the level of the upper port 92 in one minute after the lights have been lighted. When the water has bled out to this extent the combined weight of the valve operating rod 64 and of the counterweighted end of the frame 87 overcomes the weight of the bucket end of the frame sufficiently to bring the end of the rod down upon the latch 65. The bucket frame does not tilt down upon the bottom of the casing but remains against the rod 64. The dotted lines of Fig. 2 show the parts in this position. If a second person enters the hallway during the one minute period between the lighting of the lamps and the assumption by the valve operating rod and the bucket frame of the dotted line position of Fig. 2, the magnet 73 is, of course, reënergized and the latch 65 withdrawn, but this produces no effect on the apparatus since the valve operating rod is held up by the weight of water in the bucket. If, however, the second person enters the hallway after the water has reached the level of port 92 and the parts have assumed the dotted line position of Fig. 2 with the valve rod 64 resting upon the latch 65, the withdrawal of the latch allows the rod 64 and the bucket frame to tilt downwardly, re-opening valve 57 so as to fill the bucket 53 and effect a reactuation of the mechanism which gives the second person entering the hallway just as long a period of illumination as the first person had. Assuming that the apparatus is designed so as to give a minimum period of illumination of two minutes (that is, a period of two minutes to the person entering the hallway within a minute after another person has entered, the first person having, of course, a three minute period) it will require two minutes for the water to drain out from the level of the upper bleeding port 92. As soon as the bucket has completely emptied the weighted end of frame 87 drops to the bottom of the casing, leaving the valve operating rod 64 supported by the latch. The momentum of this movement momentarily compresses spring 98 bringing the lip 99 on the edge of the bucket against the cam lever 100 so as to withdraw the latch 80 and release the rocking member on which the upper bucket 53 is mounted. The bleeding port 85 in the upper bucket is proportioned so that this bucket will empty before bucket 86 empties. Hence as soon as the latch is withdrawn the contacts 26 are separated by a sharp, rapid movement from contacts 25, this being due to the elasticity of the contact springs, adjustable by set screws 55 (Fig. 4) and the weight of this end of the bucket frame. For this reason destructive arcing as between the contacts is prevented. The depression of spring 98 is only momentary. The lower bucket frame 87, immediately after depressing this spring and accomplishing the release of the contacts, assumes a position in which the finger 99 is out of contact with the cam 100.

In the apparatus disclosed in my co-pending application above referred to, the timing function was performed by the upper bucket and depended for its accuracy upon the proper proportioning of its bleeding port which was difficult to obtain. The movements of the pivoted member on which the upper bucket was disposed were relatively slow with the result that there was considerable arcing between the contacts. While this apparatus was operative, the modifications constituting my present invention have improved the apparatus by making it more accurate in its timing function and more durable.

While I have described my invention in certain preferred embodiments, modifications might be made without departure from the principles of the invention. Therefore I do not wish to be understood as limiting the invention to the particular constructions, arrangements and devices shown and described, except so far as said constructions, arrangements and devices are, by specific language, made limitations in certain of the claims herein.

I do not claim herein the features of the invention common to this application and the aforesaid co-pending application Serial No. 805,107; said features being generically claimed in said other application.

I claim:

1. In apparatus of the character described, the combination with circuit making and breaking elements, of a pivoted member on which one of said elements is carried, latch mechanism for holding said pivoted member in one position, and mechanism for applying water weight to one end of said pivoted member; said weight applying mechanism comprising means for interrupting the application of said weight, and for operating said latch mechanism to release said pivoted member from its latch-held position.

2. In apparatus of the character described, the combination with circuit making and breaking elements, of a pivoted member on which one of said elements is carried, latch mechanism for holding said pivoted member in its circuit closing position; and mechanism for applying weight to one end of said pivoted member to tilt the same to its latch-engaging position; said weight applying mechanism comprising means for interrupting the application of said weight, and for operating said latch mechanism to release said pivoted member from said latch-held position.

3. In apparatus of the character described, the combination with circuit making and breaking elements, of a pivoted member on which one of said elements is carried, latch mechanism for holding said pivoted member in its circuit closing position; and mechanism for applying weight to one end of said pivoted member to tilt the same to its latch-engaging position; said weight applying mechanism comprising means for interrupting the application of said weight, and for operating said latch mechanism to release said pivoted member from said latch-held postion after the said application of said weight has been interrupted.

4. In apparatus of the character described, the combination with circuit making and breaking elements, of a pivoted member on which one of said elements is carried, latch mechanism for holding said pivoted member in its circuit closing position; and mechanism for applying weight to one end of said pivoted member to tilt the same to its latch-engaging position; said weight applying mechanism comprising means for interrupting the application of said weight, and for operating said latch mechanism to release said pivoted member from said latch-held position; said interrupting means comprising a second pivoted member which receives weight delivered from said first-named pivoted member.

5. In apparatus of the character described, the combination with circuit making and breaking elements, of a pivoted member on which one of said elements is carried, a latch for holding said pivoted member in its circuit-closing position; and mechanism for applying weight to one end of said pivoted member to tilt the same to its latch-engaging position; said weight applying mechanism comprising means for interrupting the application of said weight, and for releasing said pivoted member from its latch-held position, said interrupting means comprising a second pivoted member which receives weight delivered from said first-named pivoted member and is thereby operated to engage means to withdraw said latch.

6. In apparatus of the character described, the combination with circuit making and breaking elements, of a pivoted member on which one of said elements is carried, a latch for holding said pivoted member in one position; and mechanism for applying weight to one end of said pivoted member to tilt the same to its latch-engaging position, said weight applying mechanism comprising means for interrupting the application of said weight, and for releasing said pivoted member from its latch-held position; said interrupting means comprising a second pivoted member which receives weight delivered from said first-named pivoted member and is thereby operated to engage means to withdraw said latch.

7. In apparatus of the character described, the combination with circuit making and breaking elements, of a pivoted member on which one of said elements is carried, a latch for holding said pivoted member in one position; and mechanism for applying weight to one end of said pivoted member to tilt the same, said weight applying mechanism comprising means for interrupting the application of said weight, and for releasing said pivoted member from its latch-held position; said interrupting means comprising a second pivoted member which receives weight delivered from said first-named pivoted member, and a cam mechanism operated thereby for withdrawing said latch.

8. In apparatus of the character described, the combination with circuit making and breaking elements, of a pivoted member on which one of said elements is carried, a latch for holding said pivoted member in one position; and mechanism for applying weight to said pivoted member so as to tilt the same, said weight applying mechanism comprising means for interrupting the application of said weight, and for releasing said pivoted member from its latch-held position; said interrupting means comprising a second pivoted member, means for applying weight thereto to tilt the same, and means operated by the tilting of said second pivoted member for withdrawing said latch.

9. In apparatus of the character described, the combination with circuit making and breaking elements, of a pivoted member on which one of said elements is carried, a latch for holding said pivoted member in one position; and mechanism for applying weight to said pivoted member so as to tilt the same, said weight applying mechanism comprising means for interrupting the application of said weight, and for releasing said pivoted member from its latch-held position; said interrupting means comprising a second pivoted member, means for applying weight thereto to tilt the same, and means operated by the tilting of said second pivoted member for withdrawing said latch after the application of said weight to the first-named pivoted member has been interrupted.

10. In apparatus of the character described, the combination with circuit making and breaking elements, of a pivoted member on which one of said elements is carried, a latch for holding said pivoted member in its circuit-closing position; and mechanism for applying weight to said pivoted member so as to tilt the same, said weight applying mechanism comprising means for interrupting the application of said weight, and for releasing said pivoted member from its latch-held position; said interrupting means comprising a second pivoted member, means for applying weight thereto to tilt the same, and means operated by the tilting of said second pivoted member for withdrawing said latch after the application of said weight to the first-named pivoted member has been interrupted.

11. In apparatus of the character described, the combination with circuit making and breaking elements, of a pivoted member which carries one of said elements and is provided with a bucket formed with a bleeding port, a latch adapted to hold said pivoted member in its circuit closing position, a fluid supply pipe which delivers into said bucket, a second pivoted member having a bucket provided with a bleeding port, which bucket is arranged to receive the overflow from the first named bucket, and means operated by the tilting of the second mentioned pivoted member for withdrawing said latch.

12. In apparatus of the character described, the combination with circuit making and breaking elements, of a pivoted member which carries one of said elements and is provided with a bucket formed with a bleeding port, a latch adapted to hold said pivoted member in its circuit closing position, a fluid supply pipe which delivers into said bucket, a second pivoted member having a bucket provided with a bleeding port, which bucket is arranged to receive the overflow from the first named bucket, and means operated by the tilting of the second mentioned pivoted member for withdrawing said latch; the bleeding ports of said buckets being proportioned so that the first named bucket is empty before the second named bucket empties.

13. In apparatus of the character described, the combination with circuit making and breaking elements, of a pivoted member which carries one of said elements and is provided with a bucket formed with a bleeding port, a latch adapted to hold said pivoted member in its circuit closing position, a fluid supply pipe which delivers into said bucket, a second pivoted member having a bucket provided with a bleeding port, which bucket is arranged to receive the overflow from the first named bucket, and cam actuated mechanism operated by the tilting of said second mentioned pivoted element for withdrawing the latch.

14. In apparatus of the character described, the combination with circuit making and breaking elements, of a bucket adapted to effect the movement of one of said elements and provided with a bleeding port, a latch to hold said elements in circuit closing position, a fluid supply pipe arranged to deliver into said bucket, a second bucket having a bleeding port and arranged to receive the overflow from the first named bucket, and means operated by the movement of said last named bucket for withdrawing said latch.

15. In apparatus of the character described, the combination with circuit making and breaking elements, of a bucket adapted to effect the movement of one of said elements and provided with a bleeding port, a latch to hold said elements in circuit closing position, a fluid supply pipe arranged to deliver into said bucket, a second bucket having a bleeding port and arranged to receive the overflow from the first named bucket, and means operated by the movement of said last named bucket for withdrawing said latch, the bleeding ports of said buckets being proportioned so that the first named bucket empties before the second named bucket.

16. In apparatus of the character described, the combination with circuit making and breaking elements, of a bucket adapted to effect the movement of one of said elements and provided with a bleeding port, a latch to hold said elements in circuit closing position, a fluid supply pipe arranged to deliver into said bucket, a second bucket having a bleeding port and arranged to receive the overflow from the first named bucket, means operated by the movement of said last named bucket for withdrawing said latch, a valve in said supply pipe, and mechanism conditioned by the position of said last named bucket for opening and closing said valve.

17. In apparatus of the character described, the combination with circuit making and breaking elements, of a bucket adapted to effect the movement of one of said elements and provided with a bleeding port, a latch to hold said elements in circuit closing position, a fluid supply pipe arranged to deliver into said bucket, a second bucket having a bleeding port and arranged to receive the overflow from the first named bucket, means operated by the movement of said last named bucket for withdrawing said latch, a valve in said supply pipe adapted to be closed by the movement of said last named bucket when filled, and mechanism which operates when said last named bucket is empty to effect the opening of said valve.

18. In apparatus of the character described, the combination with circuit making and breaking elements, of a pivoted member which carries one of said elements and is provided with a bucket formed with a bleeding port, a latch adapted to hold said pivoted member in its circuit closing position, a fluid supply pipe which delivers into said bucket, a second pivoted member having a bucket provided with a bleeding port which bucket is arranged to receive the overflow from the first named bucket, a lever operatively connected with said latch, and a finger on said bucket adapted when the bucket is emptied to engage with said lever to withdraw the latch.

19. In apparatus of the character described, the combination with circuit making and breaking elements, of a pivoted member which carries one of said elements and is provided with a bucket formed with a bleeding port, a latch adapted to hold said pivoted member in its circuit closing position, a fluid supply pipe which delivers into said bucket, a second pivoted member having a bucket provided with a bleeding port which bucket is arranged to receive the overflow from the first named bucket, a lever operatively connected with said latch, a finger on said bucket adapted when the bucket is emptied to engage with said lever to withdraw the latch, and a spring against which said second mentioned pivoted member impinges on the tilting movement which results after it has been emptied.

20. The combination with a movable element and apparatus for controlling the movement thereof comprising a bucket associated with said element, a pipe adapted to deliver a counterbalancing fluid into said bucket, locking means for holding said element in the position which it assumes when the bucket is loaded, a second bucket arranged to receive the overflow from the first named bucket, and means operated by the movement of said last named bucket for releasing said movable element from said locking means.

21. The combination with a movable element and apparatus for controlling the movement thereof comprising a bucket associated with said element, a pipe adapted to deliver a counterbalancing fluid into said bucket, locking means for holding said element in the position which it assumes when the bucket is loaded, a second bucket arranged to receive the overflow from the first named bucket, and means operated by the movement of said last named bucket for releasing said movable element from said locking means, said buckets being provided with bleeding ports proportioned so that the first named bucket is emptied before the second named bucket empties.

22. The combination with a movable element and apparatus for controlling the movement thereof comprising a bucket associated with said element, a pipe adapted to deliver a counterbalancing fluid into said bucket, a latch for holding said element in the position which it assumes when the bucket is loaded, a second bucket arranged to receive the overflow from the first named bucket, a lever operatively connected with said latch which is adapted to be moved to withdraw the latch by the movement of said second named bucket.

23. The combination with a movable element and apparatus for controlling the movement thereof comprising a bucket associated with said element, a pipe adapted to deliver a counterbalancing fluid into said bucket, a latch for holding said element in the position which it assumes when the bucket is loaded, a second bucket arranged to receive the overflow from the first named bucket, a lever operatively engaged with said latch and provided with a cam, and a lip on said last named bucket adapted to engage with said cam to rock said lever and withdraw said latch.

24. The combination with a movable element and apparatus for controlling the movement thereof, comprising a bucket associated with said element, a pipe adapted to deliver a counterbalancing fluid into said bucket, a latch for holding said element in the position which it assumes when the bucket is loaded, a second bucket arranged to receive the overflow from the first named bucket, a lever operatively connected with said latch and provided with a cam, a finger on said last named bucket which is adapted to bear against said cam to rock said lever and withdraw the latch, and a spring which is flexed to permit the engagement of said finger with said cam but normally holds said last named two parts out of contact with each other.

25. The combination with a movable element and apparatus for controlling the movement thereof, comprising a bucket associated with said element, a pipe adapted to deliver a counterbalancing fluid into said bucket, a latch for holding said element in the position which it assumes when the bucket is loaded, a second bucket arranged to receive the overflow from the first named bucket, devices operatively connected with said latch and said last named bucket which are brought into engagement with each other by the movement of the latter to withdraw said latch, and a spring which is flexed when said engagement is effected but normally holds said devices out of contact with each other.

26. The combination with a pivoted element and apparatus for controlling the movement thereof, comprising a bucket thereon, a pipe adapted to deliver a counterbalancing fluid into said bucket, a latch adapted to hold said element in the position it assumes when the bucket is loaded, a second pivoted bucket arranged to receive the overflow from the first named bucket, said buckets being formed with bleeding ports, and mechanism operated by the tilting movement of said last named bucket when empty for withdrawing said latch; the bleeding ports of said buckets being proportioned so that the first named bucket is emptied before the last named bucket.

27. The combination with a pivoted element and apparatus for controlling the movement thereof, comprising a bucket thereon, a pipe adapted to deliver a counterbalancing fluid into said bucket, a latch adapted to hold said element in the position it assumes when the bucket is loaded, a second pivoted bucket arranged to receive the overflow from the first named bucket, said buckets being formed with bleeding ports, mechanism operated by the tilting movement of said last named bucket when empty for withdrawing said latch; the bleeding ports of said buckets being proportioned so that the first named bucket is emptied before the last named bucket, a valve in said pipe, an operating member therefor, a releasable device adapted to hold said operating member in position to close the valve, and means operatively connected with said second named bucket for moving said valve operating member to its valve closing position.

28. The combination with a pivoted element and apparatus for controlling the movement thereof, comprising a bucket thereon, a pipe adapted to deliver a counterbalancing fluid into said bucket, a latch adapted to hold said element in the position it assumes when the bucket is loaded, a second pivoted bucket arranged to receive the overflow from the first named bucket, said buckets being formed with bleeding ports, mechanism operated by the tilting movement of said last named bucket when empty for withdrawing said latch; the bleeding ports of said buckets being proportioned so that the first named bucket is emptied before the last named bucket, a valve in said pipe, an operating member therefor, a releasable device adapted to hold said operating member in position to close the valve, and means operatively connected with said second named bucket for moving said valve operating member to its valve closing position, said second mentioned bucket being adapted to assume three positions according to the volume of the counterbalancing fluid therein, in one of which it holds said valve operating member in the valve closing position, in the second of which it is capable of being moved with said valve operating member to open said valve on the release of said member, the movement of said bucket from the second to the third position operating to withdraw said latch.

29. The combination with a movable element, of apparatus for controlling the movement thereof comprising a bucket having a bleeding port associated with said element, a pipe adapted to deliver a counterbalancing fluid into said bucket, a valve in said pipe, a valve operating member, a releasable device for holding said member in its valve closing position, a second bucket provided with a bleeding port and arranged to receive the overflow from the first named bucket, and means associated with the second named bucket for moving said valve operating member to its valve closing position; said second named bucket adapted to assume three positions according to the volume of the counterbalancing fluid therein, in one of which it holds said valve operating member in the valve closing position, in the second of which it is capable of being overbalanced by the movement of said valve operating member toward the valve opening position of the latter, and in the third of which it stands away from said valve operating member.

30. The combination with a movable element, of apparatus for controlling the movement thereof comprising a bucket having a bleeding port associated with said element, a pipe adapted to deliver a counterbalancing fluid into said bucket, a valve in said pipe, a valve operating member, a releasable device for holding said member in its valve closing position, a second bucket arranged to receive the overflow from the first named bucket, and means associated with the second named bucket for moving said valve operating member to its valve closing position; said second named bucket adapted to assume three positions according to the volume of the counterbalancing fluid therein, in one of which it holds said valve operating member in the valve closing position, in the second of which it is capable of being overbalanced by the movement of said valve operating member toward the valve opening position of the latter, and in the third of which it stands away from said valve operating member, said second named bucket being provided with two bleeding ports at different levels.

31. The combination with a movable element, of apparatus for controlling the movement thereof comprising a bucket having a bleeding port associated with said element, a pipe adapted to deliver a counterbalancing fluid into said bucket, a valve in said pipe, a valve operating member, a releasable device for holding said member in its valve closing position, a second bucket arranged to receive the overflow from the first named bucket, and means associated with the second named bucket for moving said valve operating member to its valve closing position; said second named bucket adapted to assume three positions according to the volume of the counterbalancing fluid therein, in one of which it holds said valve operating member in the valve closing position, in the second of which it is capable of being overbalanced by the movement of said valve operating member toward the valve opening position of the latter, and in the third of which it stands away from said valve operating member, said second named bucket being provided with two bleeding ports at different levels and with an equalizing port above said bleeding ports.

32. The combination with a movable element, of apparatus for controlling the movement thereof comprising a bucket having a bleeding port associated with said element, a pipe adapted to deliver a counterbalancing fluid into said bucket, a valve in said pipe, a valve operating member, a releasable device for holding said member in its valve closing position, a second bucket provided with a bleeding port and arranged to receive the overflow from the first named bucket, means associated with the second named bucket for moving said valve operating member to its valve closing position; said second named bucket adapted to assume three positions according to the volume of the counterbalancing fluid therein, in one of which it holds said valve operating member in the valve closing position, in the second of which it is capable of being overbalanced by the movement of said valve operating member toward the valve opening position of the latter, and in the third of which it stands away from said valve operating member, a latch adapted to hold said movable element in a position which it assumes when its bucket is loaded, and means actuated by the movement of the second named bucket when emptied for withdrawing said latch.

33. The combination with a movable element, of apparatus for controlling the movement thereof comprising a bucket having a bleeding port associated with said element, a pipe adapted to deliver a counterbalancing fluid into said bucket, a valve in said pipe, a valve operating member, a releasable device for holding said member in its valve closing position, a second bucket provided with a bleeding port and arranged to receive the overflow from the first named bucket, means associated with the second named bucket for moving said valve operating member to its valve closing position; said second named bucket adapted to assume three positions according to the volume of the counterbalancing fluid therein, in one of which it holds said valve operating member in the valve closing position, in the second of which it is capable of being overbalanced by the movement of said valve operating member toward the valve opening position of the latter, and in the third of which it stands away from said valve operating member, a latch adapted to hold said movable element in a position which it assumes when its bucket is loaded, and means actuated by the movement of the second named bucket when emptied for withdrawing said latch, the bleeding ports of said buckets being proportioned so that the first named bucket empties before the second named bucket.

34. In apparatus of the character described, the combination with a pivoted element having a bucket thereon formed with a bleeding port, a pipe adapted to discharge a counterbalancing fluid into said bucket, a latch adapted to hold said pivoted element in the position which it assumes when the bucket is loaded, a valve in said pipe, a lever to open and close said valve, a releasable device to hold the lever in the valve closing position, a second pivoted element provided with a bucket having a bleeding port, which bucket is arranged to receive the overflow from the first named bucket, said second named pivoted element adapted to assume three positions according to the volume of the counterbalancing fluid therein, in the first of which, when the bucket is filled, it holds said valve operating lever in the valve closing position, in the second of which, when partially filled, it is adapted to be counterbalanced by a movement of said lever toward its valve opening position, and means operated by the movement of said member when empty to its third position for withdrawing said latch.

35. In apparatus of the character described, the combination with a pivoted element having a bucket thereon formed with a bleeding port, a pipe adapted to discharge a counterbalancing fluid into said bucket, a latch adapted to hold said pivoted element in the position which it assumes when the bucket is loaded, a valve in said pipe, a lever to hold said pivoted element in the position which it assumes when the bucket is loaded, a valve in said pipe, a lever to open and close said valve, a releasable device to hold the lever in the valve closing position, a second pivoted element provided with a bucket having a bleeding port, which bucket is arranged to receive the overflow from the first named bucket, said second named pivoted element adapted to assume three positions according to the volume of the counterbalancing fluid therein, in the first of which, when the bucket is filled, it holds said valve operating lever in the valve closing position, in the second of which, when partially filled, it is adapted to be counterbalanced by a movement of said lever toward its valve opening position, and means operated by the movement of said member when empty to its third position for withdrawing said latch, the bleeding ports of said buckets being proportioned so that the first named bucket is emptied before the second named bucket.

36. In apparatus of the character described, the combination with a pivoted element having a bucket thereon formed with a bleeding port, a pipe adapted to discharge a counterbalancing fluid into said bucket, a latch adapted to hold said pivoted element in the position which it assumes when the bucket is loaded, a valve in said pipe, a lever to hold said pivoted element in the position which it assumes when the bucket is loaded, a valve in said pipe, a lever to open and close said valve, a releasable device to hold the lever in the valve closing position, a second pivoted element provided with a bucket having a bleeding port, which bucket is arranged to receive the overflow from the first named bucket, said second named pivoted element adapted to assume three positions according to the volume of the counterbalancing fluid therein, in the first of which, when the bucket is filled, it holds said valve operating lever in the valve closing position, in the second of which, when partially filled, it is adapted to be counterbalanced by a movement of said lever toward its valve opening position, and means operated by the movement of said member, when empty, to its third position for withdrawing said latch, the bleeding ports of said buckets being proportioned so that the first named bucket is emptied before the second named bucket, said second named bucket being provided with a bleeding port above the aforementioned bleeding port at substantially the level at which the bucket assumes its second position.

CHARLES J. POWELL.

Witnesses:
EDWARD F. FALKENBERG,
L. A. FALKENBERG.

---

Correction in Letters Patent No. 1,164,749.

It is hereby certified that in Letters Patent No. 1,164,749, granted December 21, 1915, upon the application of Charles J. Powell, of Chicago, Illinois, for an improvement in "Controlling Mechanism," an error appears in the printed specification requiring correction as follows: Page 4, line 118, claim 1, strike out the word "water"; and that the said Letters Patent should be read with this correction therein that the same may conform to the record of the case in the Patent Office.

Signed and sealed this 18th day of January, A. D., 1916.

[SEAL.]

J. T. NEWTON,

*Acting Commissioner of Patents.*

Cl. 161—25.